United States Patent
Marotta et al.

(10) Patent No.: US 10,270,347 B2
(45) Date of Patent: Apr. 23, 2019

(54) SHORT-CIRCUIT PROTECTED POWER SUPPLY CIRCUIT

(71) Applicant: HONEYWELL INTERNATIONAL INC., Morris Plains, NJ (US)

(72) Inventors: Joseph Marotta, Boonton, NJ (US); Paul Schwerman, Phoenix, AZ (US); Serdar Tevfik Sozusen, Pine Brook, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 130 days.

(21) Appl. No.: 15/680,549

(22) Filed: Aug. 18, 2017

(65) Prior Publication Data

US 2019/0058402 A1    Feb. 21, 2019

(51) Int. Cl.
*H02M 3/158* (2006.01)
*H02M 1/32* (2007.01)
*H02M 3/157* (2006.01)

(52) U.S. Cl.
CPC ........... *H02M 3/1588* (2013.01); *H02M 1/32* (2013.01); *H02M 3/157* (2013.01)

(58) Field of Classification Search
CPC ................................. H02M 1/32; H02M 3/157
See application file for complete search history.

(56) References Cited

U.S. PATENT DOCUMENTS

| | | | |
|---|---|---|---|
| 5,808,455 A * | 9/1998 | Schwartz | H02M 3/1588 323/271 |
| 5,940,287 A | 8/1999 | Brkovic | |
| 6,038,154 A | 3/2000 | Boylan et al. | |
| 6,191,964 B1 | 2/2001 | Boylan et al. | |
| 6,541,947 B1 * | 4/2003 | Dittmer | H02M 3/1588 323/222 |
| 6,760,235 B2 | 7/2004 | Lin et al. | |
| 6,841,977 B2 * | 1/2005 | Huang | H02M 3/1588 323/224 |
| 6,853,562 B2 | 2/2005 | Zhang | |
| 7,646,179 B2 * | 1/2010 | Hagino | H02M 3/1588 323/222 |
| 7,821,236 B2 * | 10/2010 | Hasegawa | H02M 3/1588 323/222 |

(Continued)

*Primary Examiner* — Jeffrey Gblende
*Assistant Examiner* — David A. Singh
(74) *Attorney, Agent, or Firm* — Lorenz & Kopf, LLP

(57) ABSTRACT

A short-circuit protected power supply circuit includes a switching power supply and a short-circuit sense/protection circuit. The switching power supply includes a synchronous rectifier, an output inductor, and an output capacitor. The synchronous rectifier is responsive to a synchronous rectifier control signal to selectively switch between an ON state and an OFF state. The output inductor and output capacitor are electrically connected in series with each other and are electrically connected in parallel with the synchronous rectifier. An output node is located between the output inductor and output capacitor. The short-circuit sense/protection circuit is coupled to the output node and is configured, upon a voltage magnitude at the output node being less than a predetermined voltage magnitude, to cause the synchronous rectifier control signal to switch the synchronous rectifier to, or keep it in, the OFF state. The short-circuit sense/protection circuit is a Schmitt trigger or an error amplifier/comparator circuit.

13 Claims, 3 Drawing Sheets

(56) References Cited

U.S. PATENT DOCUMENTS

| | | | |
|---|---|---|---|
| 7,990,121 B2* | 8/2011 | Kojima | H02M 3/1588 |
| | | | 323/282 |
| 8,354,831 B2* | 1/2013 | Wrathall | H02M 3/1588 |
| | | | 323/284 |
| 8,520,414 B2 | 8/2013 | Garrity et al. | |
| 9,018,874 B2* | 4/2015 | Guo | H02P 27/08 |
| | | | 318/400.1 |
| 9,356,529 B2 | 5/2016 | Tomiyama | |
| 9,374,011 B2 | 6/2016 | Liu et al. | |
| 9,838,000 B1* | 12/2017 | Arbetter | H03K 5/1565 |
| 2008/0175024 A1 | 7/2008 | Schlecht et al. | |
| 2008/0211552 A1 | 9/2008 | Lu | |
| 2009/0129127 A1 | 5/2009 | Shi | |
| 2009/0315530 A1* | 12/2009 | Baranwal | H02M 1/36 |
| | | | 323/288 |
| 2010/0315847 A1* | 12/2010 | Maher | H02M 3/1584 |
| | | | 363/50 |
| 2014/0192561 A1 | 7/2014 | Plesnik | |
| 2015/0318790 A1 | 11/2015 | Tichy et al. | |
| 2016/0190948 A1 | 6/2016 | Yang et al. | |
| 2016/0261203 A1 | 9/2016 | Kikuchi et al. | |
| 2016/0261204 A1 | 9/2016 | Kikuchi et al. | |
| 2017/0033698 A1 | 2/2017 | Vemuri et al. | |

\* cited by examiner

SHORT-CIRCUIT PROTECTED POWER SUPPLY CIRCUIT

STATEMENT REGARDING FEDERALLY SPONSORED RESEARCH OR DEVELOPMENT

This invention was made with Government support under NNJ06TA25C awarded by NASA. The Government has certain rights in this invention.

TECHNICAL FIELD

The present invention generally relates to power supply circuits, and more particularly relates to short-circuit protected power supply circuits, such as switching power supplies with synchronous rectifiers.

BACKGROUND

Switching-mode power supplies, also known as switched-mode power supplies (SMPS), are widely used in applications that rely on DC-DC electrical power conversion. A typical SMPS includes a controllable power switch, such as a MOSFET (metal-oxide semiconductor field-effect transistor), a rectifier, output circuitry, and a controller. The controller is used to switch the power switch between its ON state, in which it is conducting current, and its OFF state, in which it is not conducting current. The alternating current is rectified and filtered, via the rectifier and output circuitry, and the filtered DC is supplied to a load.

In some SMPS the rectifier is implemented using a synchronous rectifier. That is, another controllable switch, such as a MOSFET, that is also controlled, via the controller, to switch between its ON and OFF states. Using a synchronous rectifier is advantageous, in that it exhibits lower conduction losses and fairly linear resistance characteristics. One drawback of the synchronous rectifier topology is that excessive power dissipation can occur in the synchronous rectifier under certain conditions, such as an output short-circuit, power down, and back bias conditions.

Hence, there is a need for a switching power supply that is implemented with a synchronous rectifier that does not dissipate undesirably high power under certain conditions, such as an output short-circuit, power down, and back bias conditions. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter. Among other things, the embodiments described herein increase the volt second product of the discharge of the output filter inductor by disabling the synchronous rectifier and using diode rectification during load short circuit or back biased conditions. This allows the inductor to avoid saturation, which may cause excessive component power dissipation during a short circuit or back bias condition.

In one embodiment, a short-circuit protected power supply circuit includes a switching power supply and a Schmitt trigger circuit. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The Schmitt trigger circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state.

In another embodiment, a short-circuit protected power supply circuit includes a switching power supply, an inverting Schmitt trigger circuit, a NOR-logic circuit, and a diode. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The inverting Schmitt trigger circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state. The NOR-logic circuit is coupled between the Schmitt trigger circuit and the synchronous rectifier. The diode is coupled in series between the Schmitt trigger circuit and the output node, and is configured to conduct when the voltage magnitude at the output node is less than the predetermined voltage magnitude.

In yet another embodiment, a short-circuit protected power supply circuit includes a switching power supply and a short-circuit sense/protection circuit. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The short-circuit sense/protection circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state. The short-circuit sense/protection circuit includes an error amplifier and a comparator circuit. The error amplifier is configured to compare the voltage magnitude at the output node to a first reference voltage and supply an error output signal based on the comparison. The comparator circuit is coupled to receive the error output signal and a second reference voltage. The comparator is configured to compare the error output signal and the second reference voltage and, based on the comparison, to selectively cause the synchronous rectifier control signal to switch the synchronous rectifier to, or keep the synchronous rectifier in, the OFF state.

Furthermore, other desirable features and characteristics of the short-circuit protected power supply circuit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
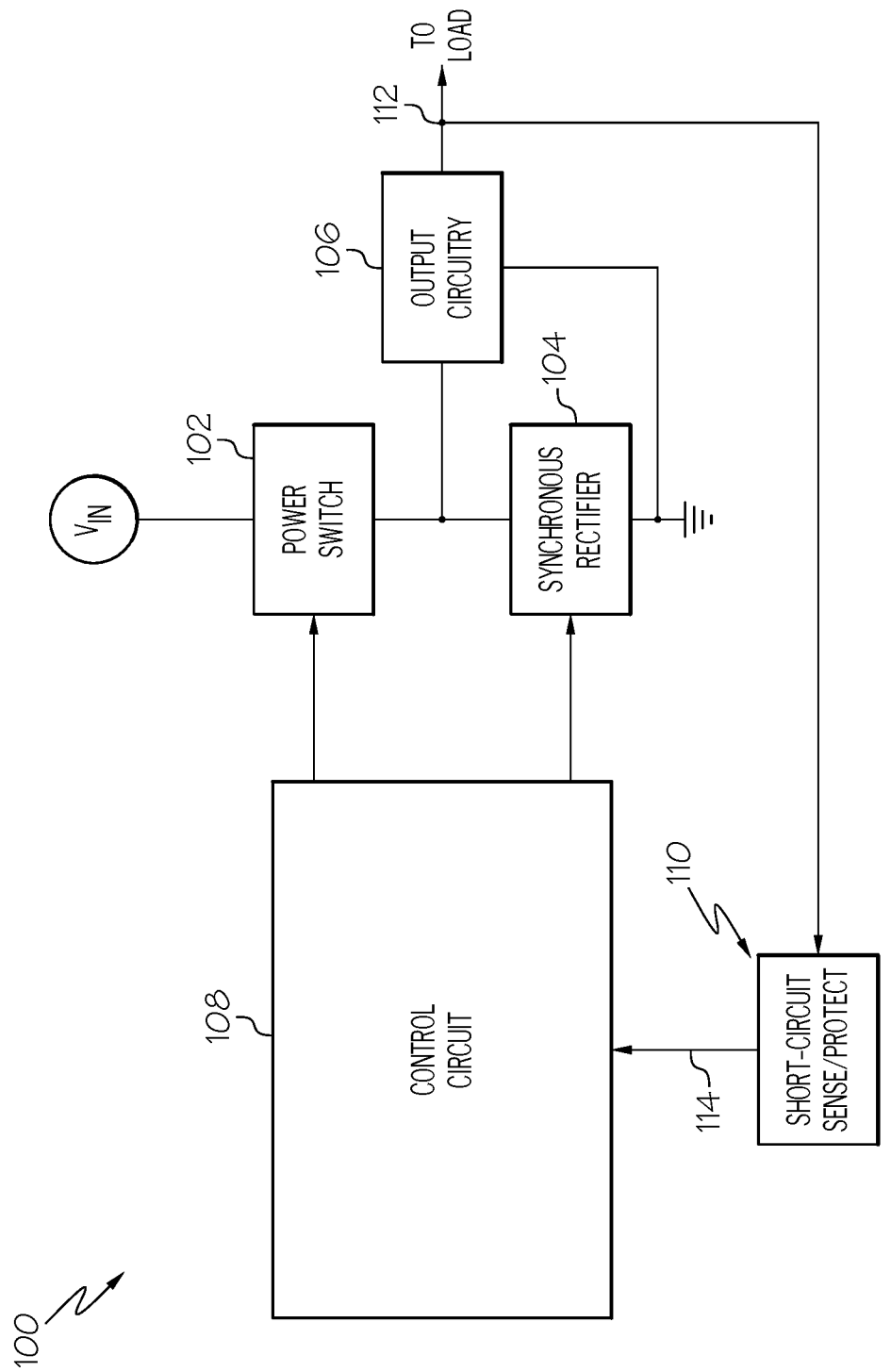
FIG. 1 depicts a functional block diagram of one embodiment of a short-circuit protected power supply circuit.

Referring first to FIG. 1, a functional block diagram of one embodiment of a short-circuit protected power supply circuit 100 is depicted. The depicted circuit 100 includes a power switch 102, a synchronous rectifier 104, output circuitry 106, a control circuit 108, and a short-circuit sense/protection circuit 110. The circuit 100, as may be appreciated, is configured as a switched-mode power supply circuit, the operation of which is generally well-known, and will not be described in detail.

As is generally known, the power switch 102 and the synchronous rectifier 104 are each configured, in response to control signals supplied by the control circuit 108, to switch between an ON state and an OFF state. More specifically, the control signals supplied by the control circuit 108 are such that when the power switch 102 is in the ON state, the synchronous rectifier 104 is in the OFF state, and vice-versa. In this manner, DC is supplied, via the output circuitry 106, to a load (not depicted) that is coupled to an output node 112.

The short-circuit sense/protection circuit 110 is coupled to, and thus receives a signal representative of the voltage at, the output node 112. The short-circuit sense/protection circuit 110 is configured to compare the voltage magnitude at the output node 112 to a reference voltage magnitude. The short-circuit sense/protection circuit 110 is further configured, upon the voltage magnitude at the output node 112 being less than a predetermined voltage magnitude, to supply a synchronous rectifier shutdown signal 114. The synchronous rectifier shutdown signal 114, at least in the depicted embodiment, is supplied to the control circuit 108. The control circuit 108, upon receipt of the synchronous rectifier shutdown signal 114, controls the synchronous rectifier 104 to switch to, or remain in, the OFF state.

The power switch 102, synchronous rectifier 104, output circuitry 106, control circuit 108, and short-circuit sense/protection circuit 110 may be variously configured to implement the functionality described above. One embodiment is depicted in FIG. 2, and with reference thereto will now be described.

Figure 2:
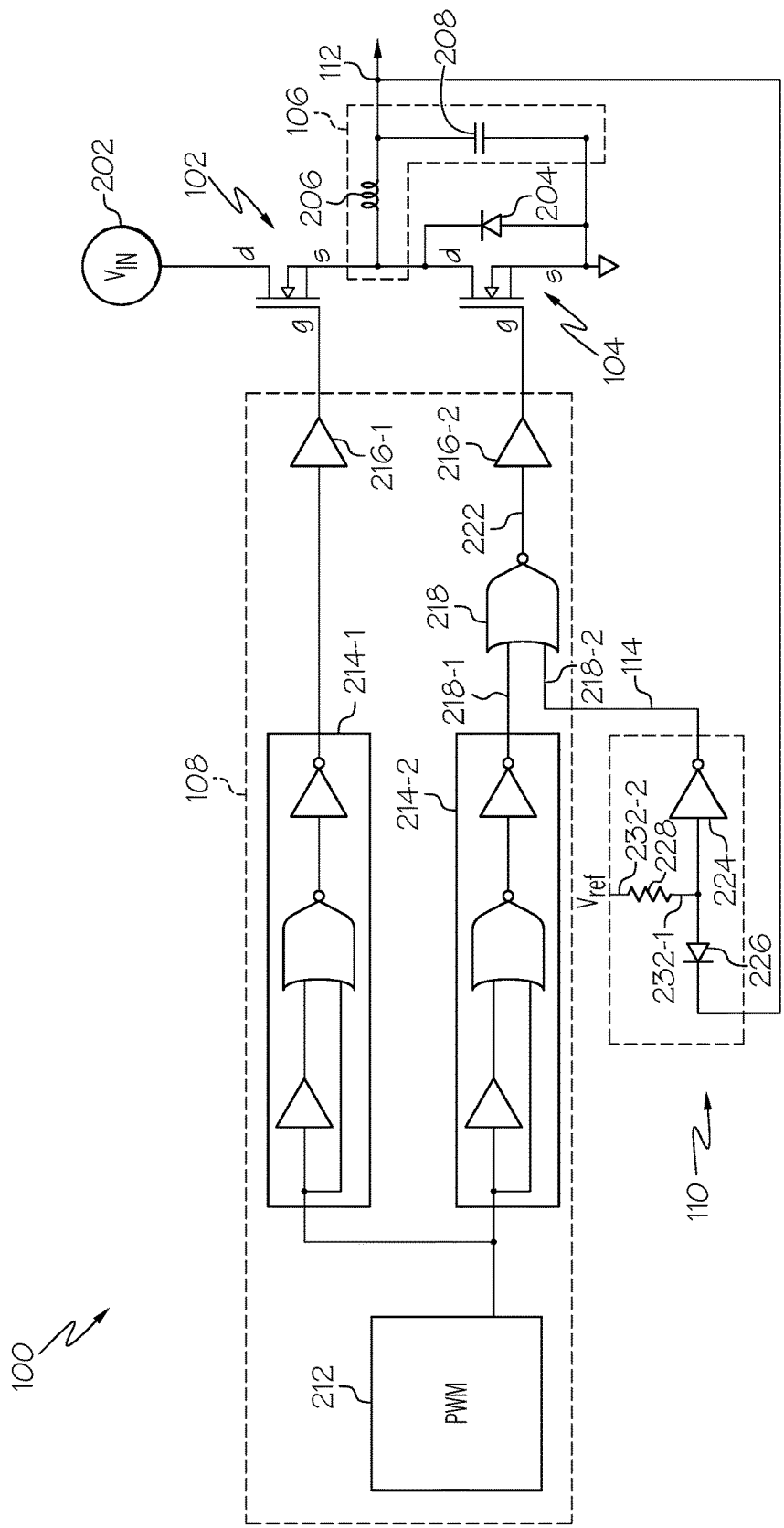
FIG. 2 a more detailed schematic representation of one embodiment of the short-circuit protected power supply circuit of FIG. 1.

As FIG. 2 depicts, the power switch 102 and synchronous rectifier 104 are both implemented metal-oxide semiconductor field-effect transistors (MOSFETs), and more specifically using N-channel MOSFETs. It will be appreciated that P-channel MOSFETs, or other types of FETs, transistors, or controllable switches may also be used. As MOSFETs, the power switch 102 and synchronous rectifier 104 each include a gate terminal (g), a source terminal (s), and a drain terminal (d). The gate terminals are each coupled to the control circuit 108, and receive the control signals therefrom. The source terminal of the power switch 102 is coupled to an input voltage source 202, and its drain terminal is coupled to the source terminal of the synchronous rectifier 104. The source terminal of the synchronous rectifier 104 is coupled to circuit common. As FIG. 2 also depicts, the depicted embodiment further includes a first diode 204, which is connected to the source and drain terminals of the synchronous rectifier 104. The first diode 204 may be an internal or external diode.

The output circuitry 106 is electrically connected in parallel with the synchronous rectifier 104, and includes an output inductor 206 and an output capacitor 208. The output inductor 206 and output capacitor 208 are electrically connected in series with each other to form a series LC circuit, and the output node 112 is located between the output inductor 206 and output capacitor 206.

The control circuit 108, as noted above, is coupled to, and is configured to supply control signals to, the power switch 102 and to the synchronous rectifier 104. In the depicted embodiment, the control circuit 108 implements its functionality using a pulse-width modulator (PWM) controller 212, a first delay circuit 214-1, a second delay circuit 214-2, a first non-inverting amplifier circuit 216-1, a second non-inverting amplifier circuit 216-2, and a NOR-logic circuit 218.

The PWM controller 212 may be implemented using any one of numerous known devices that are configured to generate and supply a PWM output signal. The PWM output signal is simultaneously supplied to the first and second delay circuits 214-1, 214-2. The first and second delay circuits 214-1, 214-2 are implemented using any one of numerous known delay circuit topologies, and are each configured to implement, in a well-known manner, a delay that is sufficient to ensure proper switching operation of the power switch 102 and synchronous rectifier 104.

The signal output from the first delay circuit 214-1, which is referred to herein as the power switch control signal, is supplied to the first non-inverting amplifier circuit 216-1. The first non-inverting amplifier 214 is coupled to, and thus supplies the power switch control signal to, the gate terminal of the power switch 102. The signal output from the second delay circuit 214-2, which is referred to herein as the synchronous rectifier control signal, is supplied to the NOR-logic circuit 218.

The NOR-logic circuit 218 has a first input 218-1, a second input 218-2, and an output 222. The output 222 is coupled, via the second non-inverting amplifier 216-2, to the synchronous rectifier 104. The first input 218-1 is coupled to the second delay circuit 214-2, and thus receives the synchronous rectifier control signal therefrom. The second input 218-2 is coupled to the short-circuit sense/protection circuit 110, and thus receives the synchronous rectifier shutdown signal 114.

The short-circuit sense/protection circuit 110 is implemented using an inverting Schmitt trigger circuit 224, a second diode 226, and a resistor 228. The second diode 226 is coupled in series between the Schmitt trigger circuit 224 and the output node 112, and is configured to conduct when the voltage magnitude at the output node 112 is less than a predetermined voltage magnitude (e.g., 0.4 V, which is indicative of a short-circuit). The resistor 228 has a first terminal 232-1 and a second terminal 232-2. The first terminal 232-1 is connected between the second diode 226 and the Schmitt trigger circuit 224, and the second terminal 232-2 is adapted to couple to a reference voltage (Vref).

The inverting Schmitt trigger circuit 224 is coupled, via the second diode 226, to the output node 112 and, as noted above, is also coupled to the NOR-logic circuit second input 218-2. The inverting Schmitt trigger circuit 224 is configured, upon the voltage magnitude at the output node 112 being less than the predetermined voltage magnitude, to supply the synchronous rectifier shutdown signal 114 to the NOR-logic circuit second input 218-2. The NOR-logic circuit 218, upon receipt of the synchronous rectifier shutdown signal 114, will cause the synchronous rectifier 104 to switch to, or remain in, the OFF state.

More specifically, when the voltage at the output node 112 is at or below the predetermined voltage magnitude (e.g., short-circuited), the second diode 226 conducts, pulling the input to the Schmitt trigger circuit 224 low. As a result, the output of the Schmitt trigger circuit 224 (i.e., the synchronous rectifier shutdown signal 114) goes high, which means the output 222 of the NOR-logic circuit 218 goes low, causing the synchronous rectifier 104 to switch to, or remain in, the OFF state. Thus, the first diode 204, instead of the synchronous rectifier 104, conducts the current from the inductor 206 when the power switch 102 is in the OFF state. This increases the volt-second product across the inductor 206 during the off time, because the voltage drop across the first diode 204 is several times higher than the voltage drop across the synchronous rectifier 104. This increased volt-second product prevents the inductor 206 from going into current run-away.

Figure 3:
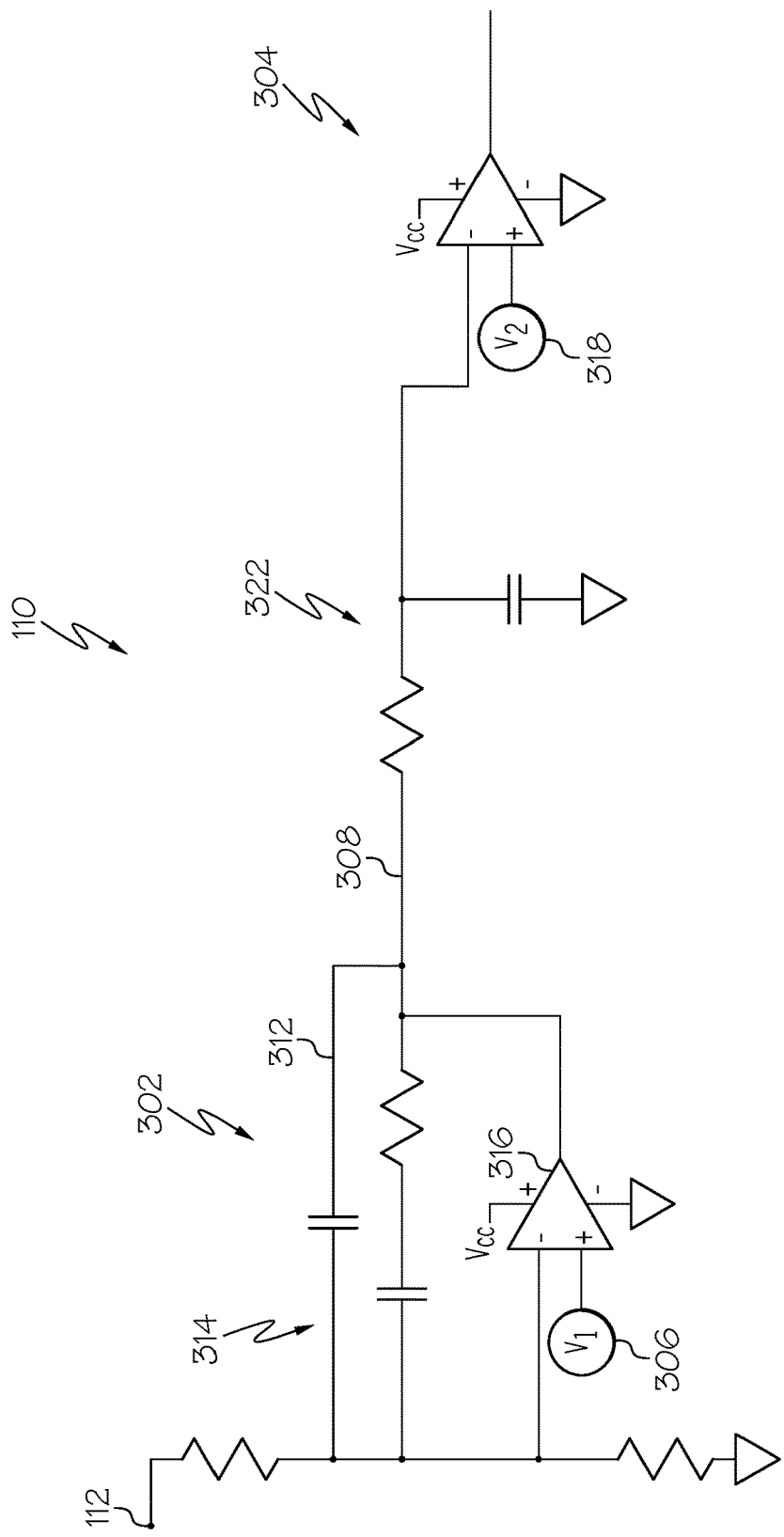
FIG. 3 a more detailed schematic representation of one embodiment of short-circuit sense/protection circuit that may be used in the short-circuit protected power supply circuit of FIG. 1.

Turning now to FIG. 3, an alternative embodiment of the short-circuit sense/protection circuit 110 is depicted, and includes an error amplifier 302 and a comparator circuit 304. The error amplifier 302 configured to compare the voltage magnitude at the output node 112 to a first reference voltage 306 and supply an error output signal 308 based on the comparison. In the particular depicted embodiment, when the feedback signal 312 in the feedback network 314 of the op-amp 316 exceeds the voltage that requests 100% output power, this indicates that the output is in overcurrent or in a short-circuit condition.

The comparator circuit 304 is coupled to receive the error output signal 308 and is coupled to a second reference voltage 318. The comparator circuit 304 is configured to compare the error output signal 308 and the second reference voltage 318 and, based on the comparison, to selectively cause the synchronous rectifier control signal to switch the synchronous rectifier to, or keep the synchronous rectifier in, the OFF state.

As FIG. 3 also depicts, the short-circuit sense/protection circuit 110, at least in this embodiment, further includes a filter circuit 322. The filter circuit 322 is coupled between the error amplifier 302 and the comparator circuit 304, and filters the error output signal 308 to prevent trips during step loads.

In one embodiment, a short-circuit protected power supply circuit includes a switching power supply and a Schmitt trigger circuit. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The Schmitt trigger circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state.

These aspects and other embodiments may include one or more of the following features. The synchronous rectifier may include a field-effect transistor (FET) circuit. The FET circuit may include a metal-oxide semiconductor FET (MOSFET) having a gate terminal, a source terminal, and a drain terminal, and a diode connected to the source terminal and the drain terminal. The Schmitt trigger is configured as an inverting Schmitt trigger. The short-circuit protected power supply circuit may further include a NOR-logic circuit coupled between the Schmitt trigger circuit and the synchronous rectifier. The short-circuit protected power supply circuit may further include a controller coupled to the NOR-logic circuit and configured to supply the synchronous rectifier control signal. The short-circuit protected power supply circuit may further include a non-inverting amplifier circuit coupled between the NOR-logic circuit and the synchronous rectifier. The short-circuit protected power supply circuit may further include a diode coupled in series between the Schmitt trigger circuit and the output node. The diode is configured to conduct when the voltage magnitude at the output node is less than the predetermined voltage magnitude. The short-circuit protected power supply circuit may further include a resistor having a first terminal and a second terminal, where the first terminal is connected between the diode and the Schmitt trigger circuit, and the second terminal is adapted to couple to a reference voltage. The switching power supply may further include a power switch connected in series with the synchronous rectifier, the output inductor, and the output capacitor, and the power switch is responsive to a power switch control signal to selectively switch between an ON state and an OFF state.

In another embodiment, a short-circuit protected power supply circuit includes a switching power supply, an inverting Schmitt trigger circuit, a NOR-logic circuit, and a diode. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The inverting Schmitt trigger circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state. The NOR-logic circuit is coupled between the Schmitt trigger circuit and the synchronous rectifier. The diode is coupled in series between the Schmitt trigger circuit and the output node, and is configured to conduct when the voltage magnitude at the output node is less than the predetermined voltage magnitude.

These aspects and other embodiments may include one or more of the following features. The synchronous rectifier may include a field-effect transistor (FET). The FET circuit may include a metal-oxide semiconductor FET (MOSFET) having a gate terminal, a source terminal, and a drain terminal, and a diode connected to the source terminal and the drain terminal. The short-circuit protected power supply circuit may further include a non-inverting amplifier circuit coupled between the NOR-logic circuit and the synchronous rectifier. The short-circuit protected power supply circuit may further include a resistor having a first terminal and a second terminal, where the first terminal is connected between the diode and the Schmitt trigger circuit, and the second terminal is adapted to couple to a reference voltage. The switching power supply may further include a power switch connected in series with the synchronous rectifier, the output inductor, and the output capacitor, and the power switch is responsive to a power switch control signal to selectively switch between an ON state and an OFF state.

In yet another embodiment, a short-circuit protected power supply circuit includes a switching power supply and a short-circuit sense/protection circuit. The switching power supply includes a synchronous rectifier, an output inductor, an output capacitor, and an output node. The synchronous rectifier is responsive to a synchronous rectifier control signal to selectively switch between an ON state and an OFF state. The output inductor and output capacitor are electrically connected in series with each other to form a series LC circuit that is electrically connected in parallel with the synchronous rectifier. The output node is located between the output inductor and output capacitor. The short-circuit sense/protection circuit is coupled to the output node and is configured, upon a voltage magnitude at the output node being less than a predetermined voltage magnitude, to cause the synchronous rectifier control signal to switch the synchronous rectifier to, or keep the synchronous rectifier in, the OFF state. The short-circuit sense/protection circuit includes an error amplifier and a comparator circuit. The error amplifier is configured to compare the voltage magnitude at the output node to a first reference voltage and supply an error output signal based on the comparison. The comparator circuit is coupled to receive the error output signal and a second reference voltage. The comparator is configured to compare the error output signal and the second reference voltage and, based on the comparison, to selectively cause the synchronous rectifier control signal to switch the synchronous rectifier to, or keep the synchronous rectifier in, the OFF state.

These aspects and other embodiments may include one or more of the following features. The short-circuit sense/protection circuit further includes a filter circuit coupled between the error amplifier and the comparator circuit.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A short-circuit protected power supply circuit, comprising:
   a switching power supply comprising a synchronous rectifier, an output inductor, an output capacitor, and an output node, the synchronous rectifier responsive to a synchronous rectifier control signal to selectively switch between an ON state and an OFF state, the output inductor and output capacitor electrically connected in series with each other to form a series LC circuit that is electrically connected in parallel with the synchronous rectifier, the output node located between the output inductor and output capacitor;
   an inverting Schmitt trigger circuit coupled to the output node and configured, upon a voltage magnitude at the output node being less than a predetermined voltage magnitude, to cause the synchronous rectifier control signal to switch the synchronous rectifier to, or keep the synchronous rectifier in, the OFF state;
a NOR-logic circuit coupled between the inverting Schmitt trigger circuit and the synchronous rectifier; and
a controller coupled to the NOR-logic circuit and configured to supply the synchronous rectifier control signal.

2. The short-circuit protected power supply circuit of claim 1, wherein the synchronous rectifier comprises a field-effect transistor (FET) circuit.

3. The short-circuit protected power supply circuit of claim 2, wherein the FET circuit comprises:
a metal-oxide semiconductor FET (MOSFET) including a gate terminal, a source terminal, and a drain terminal; and
a diode connected to the source terminal and the drain terminal.

4. The short-circuit protected power supply circuit of claim 1, further comprising:
a non-inverting amplifier circuit coupled between the NOR-logic circuit and the synchronous rectifier.

5. The short-circuit protected power supply circuit of claim 1, further comprising:
a diode coupled in series between the inverting Schmitt trigger circuit and the output node, the diode configured to conduct when the voltage magnitude at the output node is less than the predetermined voltage magnitude.

6. The short-circuit protected power supply circuit of claim 5, further comprising:
a resistor having a first terminal and a second terminal, the first terminal connected between the diode and the inverting Schmitt trigger circuit, the second terminal adapted to couple to a reference voltage.

7. The short-circuit protected power supply circuit of claim 1, wherein the switching power supply further comprises:
a power switch connected in series with the synchronous rectifier, the output inductor, and the output capacitor, the power switch responsive to a power switch control signal to selectively switch between an ON state and an OFF state.

8. A short-circuit protected power supply circuit, comprising:
a switching power supply comprising a synchronous rectifier, an output inductor, an output capacitor, and an output node, the synchronous rectifier responsive to a synchronous rectifier control signal to selectively switch between an ON state and an OFF state, the output inductor and output capacitor electrically connected in series with each other to form a series LC circuit that is electrically connected in parallel with the synchronous rectifier, the output node located between the output inductor and output capacitor;
an inverting Schmitt trigger circuit coupled to the output node and configured, upon a voltage magnitude at the output node being less than a predetermined voltage magnitude, to cause the synchronous rectifier control signal to switch the synchronous rectifier to, or keep the synchronous rectifier in, the OFF state;
a NOR-logic circuit coupled between the inverting Schmitt trigger circuit and the synchronous rectifier; and
a diode coupled in series between the inverting Schmitt trigger circuit and the output node, the diode configured to conduct when the voltage magnitude at the output node is less than the predetermined voltage magnitude.

9. The short-circuit protected power supply circuit of claim 8, wherein the synchronous rectifier comprises a field-effect transistor (FET).

10. The short-circuit protected power supply circuit of claim 9, wherein the FET circuit comprises:
a metal-oxide semiconductor FET (MOSFET) including a gate terminal, a source terminal, and a drain terminal; and
a diode connected to the source terminal and the drain terminal.

11. The short-circuit protected power supply circuit of claim 10, further comprising a non-inverting amplifier circuit coupled between the NOR-logic circuit and the synchronous rectifier.

12. The short-circuit protected power supply circuit of claim 8, further comprising:
a resistor having a first terminal and a second terminal, the first terminal connected between the diode and the inverting Schmitt trigger circuit, the second terminal adapted to couple to a reference voltage.

13. The short-circuit protected power supply of claim 8, wherein the switching power supply further comprises:
a power switch connected in series with the synchronous rectifier, the output inductor, and the output capacitor, the power switch responsive to a power switch control signal to selectively switch between an ON state and an OFF state.

* * * * *